J. W. RICKER.
Hitching-Bars for Animals.

No. 224,356. Patented Feb. 10, 1880.

Witnesses
W. A. Cambridge
Edward E. Peter

Inventor
John W. Ricker

UNITED STATES PATENT OFFICE.

JOHN W. RICKER, OF CHELSEA, MASSACHUSETTS.

HITCHING-BAR FOR ANIMALS.

SPECIFICATION forming part of Letters Patent No. 224,356, dated February 10, 1880.

Application filed December 30, 1879.

*To all whom it may concern:*

Be it known that I, JOHN W. RICKER, of Chelsea, in the county of Suffolk and State of Massachusetts, have invented certain Improvements in Hitching-Bars for Animals, of which the following is a full, clear, and exact description, reference being had to the accompanying drawings, making part of this specification, in which—

Figure 1:
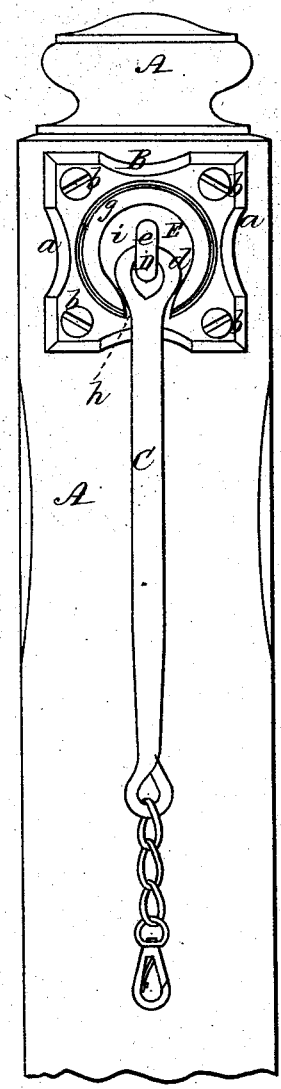
Figure 2:
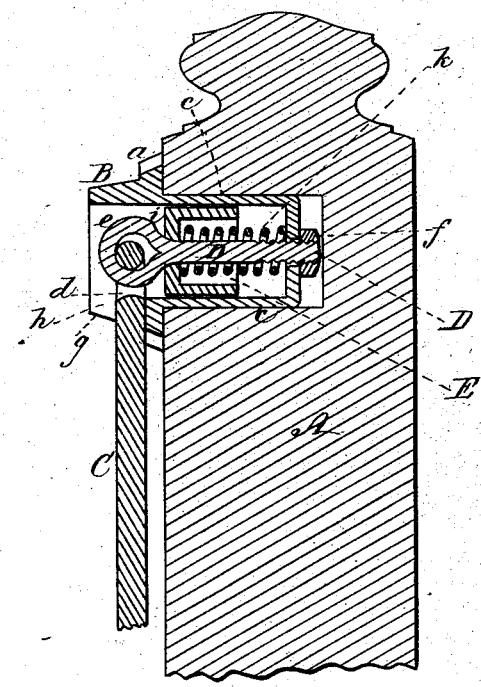
Figure 3:
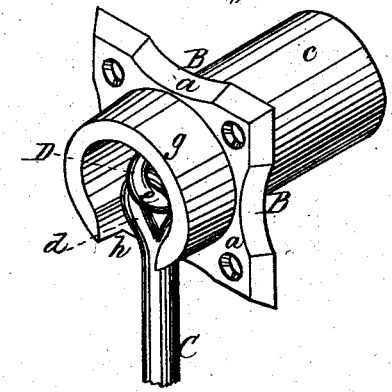

Figure 1 is a front elevation of a post having my improved hitching device attached thereto. Fig. 2 is a vertical section through the center of the same. Fig. 3 is a perspective view of the hitching device detached from the post.

Hitching devices have been constructed in which a rigid bar has been pivoted to an eyebolt screwed into a post and surrounded by a socket which acted as a stop for the bar to prevent the animal from getting onto the sidewalk or injuring the post. This construction is objectionable, as it does not secure a free swiveling motion for the bar, and the eyebolt is liable to be unscrewed or loosened by the movements of the animal attached to the bar.

A hitching device has also been constructed in which a rigid bar was provided with a ball at its inner end fitting into a corresponding socket secured by screws to a post, thus forming a ball-and-socket or universal joint; but this construction, while it afforded the bar a free swiveling movement in all directions, was nevertheless objectionable for the reason that the bar, when brought up against the edge of the flange of the socket exerted a powerful leverage, which was liable to either break the socket or tear out the screws which held it to the post, thus rendering the device useless.

My invention has for its object to overcome all of the above-mentioned difficulties; and it consists in a socket provided on its rear side with a tubular extension or projecting portion which fits into a corresponding recess formed in the post or other object to which it is attached, in combination with a hitching-bar linked or pivoted to a swiveling eyebolt passing centrally through the extension in the direction of its length, and secured thereto, by a screw-nut or otherwise, so as to be capable of turning freely on its axis, by which construction the strain is brought centrally upon the extension in the direction of its length, and the liability of the socket being broken or torn out of the post is entirely avoided, as the screws by which it is secured in place are relieved by the tubular extension of the strain to which they have heretofore been subjected.

My invention also consists in the combination, with the socket and its extension, of a cylinder or sleeve which surrounds the eyebolt to which the hitching-bar is pivoted, and serves to keep it in a central position, and thus prevent the inner end of the hitching-bar from being brought into contact with and exerting a leverage against the inside of the flange of the socket, the breaking of which from this cause is thus avoided.

My invention also consists in the combination, with the socket, sleeve, and eyebolt, of a spring for keeping the front end of the sleeve at all times out against the eye of the eyebolt, whereby the bolt is always caused to be supported centrally at a point immediately back of the eye, which prevents it from becoming bent by the strain to which it is subjected.

To enable others skilled in the art to understand and use my invention, I will proceed to describe the manner in which I have carried it out.

In the said drawings, A represents a hitching-post, to which is secured, by screws *b* passing through the corners of the face-plate *a*, a cast-iron socket, B, provided at its rear with a tubular extension or projecting portion, *c*, which fits snugly into a recess in the post made to receive it.

C is a rigid hitching-bar of any suitable length, which is provided at its outer end with a short chain and snap-hook or other device for attaching it to the bit of a horse's bridle, the inner end of the bar C being linked or connected, by means of an eye or loop, *d*, with the eye *e* of an eyebolt, D, which is located within the socket B and extends centrally through it, being secured thereto outside the rear end of the extension *c* by means of a screw-nut, *f*, in such a manner that it will turn freely on its axis, thus affording to the bar C a free swiveling movement in all directions, as desired.

The flange *g* of the socket B is provided on its under side with a notch, $h$, which allows the bar C to drop down out of the way when not in use.

The eye $e$ of the bolt D lies entirely within the flange $g$, and is so placed that when the bar C is raised and attached to the horse's bit the flange $g$ will serve as a stop to limit the movement of the bar C, and thus prevent the horse from getting upon the sidewalk or coming into contact with the post; and it will be seen that any lateral strain on the socket exerted by the hitching-bar while in contact with the flange $g$ will cause the tubular extension $c$ to bear against the side of the recess in the post, which thus resists the strain and entirely relieves the screws $b$, which have heretofore been subjected to this strain, and consequently the liability of the socket being wrenched or torn out of the post or broken is entirely avoided.

Instead of the eyebolt D being secured in place by a screw-nut, $f$, it may be riveted or otherwise secured in any suitable manner which will allow it to turn freely on its axis.

Within the tubular portion of the socket B is fitted a sleeve or cylinder, E, provided at its front end with a head, $i$, through a central aperture in which passes the eyebolt D, which is by this means kept in a central position with respect to the interior of the socket, whereby the eye $d$ at the inner end of the hitching-bar C is prevented from coming into contact with and exerting a leverage against the inside of the flange $g$, the breaking of which is thus avoided.

The position of the eyebolt D can be adjusted by means of the screw-nut $j$ so as to vary the angle of the hitching-bar C when in contact with the edge of the flange $g$, thus allowing more or less movement to the animal attached to the bar.

$k$ is a spiral spring, which is placed within the sleeve E, and serves to constantly press it outward against the eye $e$ of the bolt D in order that the bolt may always, when adjusted in any position by the screw-nut $f$, be supported by the head $i$ of the sleeve E at a point immediately in the rear of the eye $e$, which effectually prevents the bolt from being bent by the strain to which it is subjected.

What I claim as my invention, and desire to secure by Letters Patent, is—

1. The socket B, provided at its rear with a tubular extension or projecting portion, $c$, in combination with the hitching-bar C, linked or pivoted to an eyebolt, D, passing centrally through the extension $c$ in the direction of its length and secured thereto so as to swivel or turn freely on its axis, substantially in the manner and for the purpose set forth.

2. The combination, with the socket B, of the cylinder or sleeve E, located within the tubular extension $c$, and surrounding the eyebolt D, substantially as and for the purpose described.

3. The combination, with the socket B, sleeve E, and eyebolt D, of the spring $k$, adapted to press the sleeve constantly out against the eye $e$ of the bolt D, substantially as and for the purpose set forth.

Witness my hand this 24th day of December, A. D. 1879.

JOHN W. RICKER.

In presence of—
   P. E. TESCHEMACHER,
   W. J. CAMBRIDGE.